A. P. JORDAN.
MAIZE HEADER.
APPLICATION FILED JAN. 29, 1920.
1,378,679.
Patented May 17, 1921.
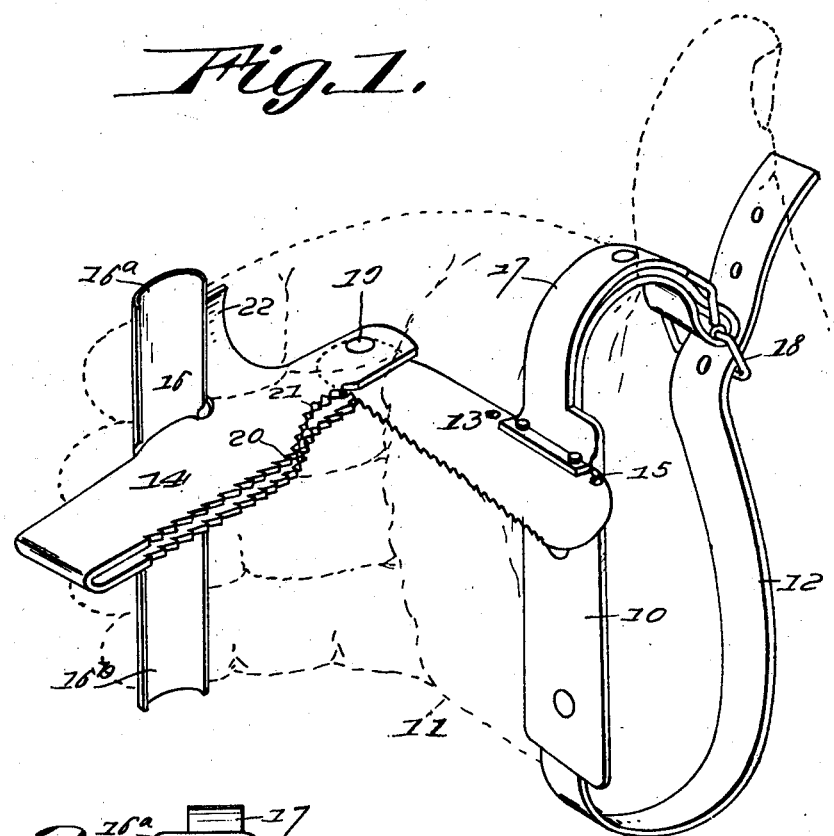
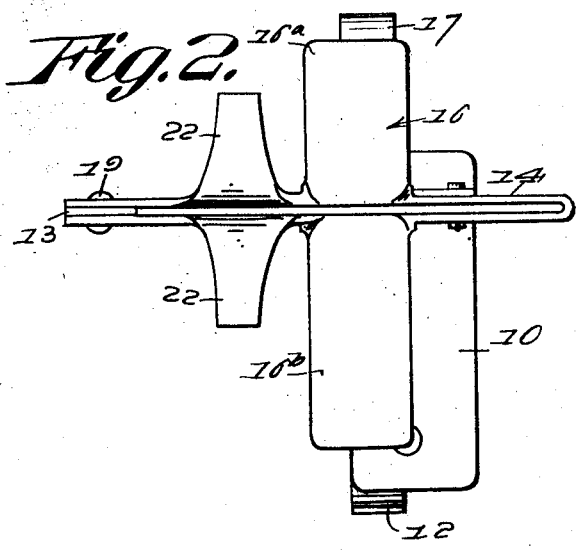
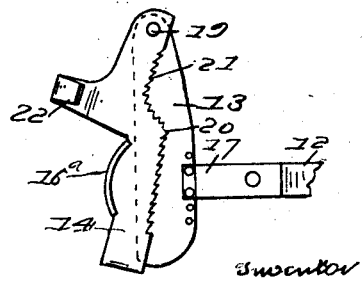
Inventor
A. P. Jordan,
by
Attorney

UNITED STATES PATENT OFFICE.

ANDREW P. JORDAN, OF WINTERS, TEXAS.

MAIZE-HEADER.

1,378,679.  Specification of Letters Patent.  Patented May 17, 1921.

Application filed January 29, 1920. Serial No. 354,859.

*To all whom it may concern:*

Be it known that I, ANDREW P. JORDAN, a citizen of the United States of America, residing at Winters, in the county of Runnels and State of Texas, have invented new and useful Improvements in Maize-Headers, of which the following is a specification.

The object of the invention is to provide a simple and efficient manually operable implement for heading maize, Kafir corn, broom corn, sorghum and the like, the same being adapted for attachment to the hand of the operator in a convenient position for manipulation with the minimum effort upon the part of the operator and under such conditions as to leave the other hand free, and with these objects in view the invention consists in a construction and combination of parts of which a preferred embodiment is shown in the accompanying drawing, wherein:

Figure 1 is a perspective view of the apparatus applied in the operative position to a hand which is shown in dotted lines.

Fig. 2 is an elevation of the device in its closed position.

Fig. 3 is a plan view.

The implement consists essentially of a base or palm plate 10 provided with means whereby it may be readily attached to the hand of the operator as shown in dotted lines at 11 as by an adjustable strap 12, and pivotally connected coöperative blades 13 and 14, the former of which is stationary and is seated upon the base or palm plate as at 15 while the latter is movable relative to the former and carries a bearing element 16 disposed transversely to the blade to receive the pressure of the fingers of the hand in closing the blades in the cutting operation.

In the construction illustrated the base or palm plate is provided with the transverse seat 15 in which the fixed blade or knife is removably mounted to permit of displacement for sharpening or renewal, said base being extended at its upper end to form a curved guard 17 which extends over the upper or inner side of the palm of the hand to which the apparatus is fitted, the securing member consisting of the strap 12 or its equivalent in the nature of a flexible band being provided with adjusting means such as a buckle 18 by which the base or palm plate may be bound firmly in place to support the fixed blade or knife 13 with sufficient rigidity to properly sustain the movable blade in operation. Said movable blade is mounted upon the fixed blade by means of a pivot 19 and is preferably provided with spaced parallel cutting edges 20 between which the cutting edge of the fixed blade operates, and either or both blades may be serrated at their cutting edges as shown, with the serrations of the movable blade inclined or directed toward the pivotal end thereof to prevent the outward sliding or slipping of the stalks as the heads are detached or are subjected to the action of the cutting edges. Moreover the cutting edges of the movable blade are preferably arranged near the pivotal end of the blade on a receding line, more or less curved with reference to the length of the blade to produce a pocket 21 to still further increase the holding or retaining tendency of the blade with reference to the objects to be severed.

In the construction illustrated the several members of the apparatus are struck from sheet or plate metal, inclusive of the movable blade which is folded upon itself to produce the parallel spaced cutting elements provided with the above described cutting edges, the bearing member 16 consisting of ears $16^a$ and $16^b$ which are formed respectively as lateral extensions of the blank forming the blade 14 and being bent relative to the plane thereof to occupy positions perpendicular thereto, said ears being transversely bent or rounded to produce outer convexed bearing surfaces for the contact of the fingers of the operator's hand. Also finger holds 22 of curved form are extended from the elements of the blank forming the movable blade to contact with the rear or outer surfaces of the fingers of the hand grasping the device and designed to receive the outward or backward pressure of the fingers to open the device for the reception of the stalks to be severed.

Thus in operation, after the device has been properly positioned upon the hand, the only movement necessary to manipulate the device is that incident to opening and closing the hand or moving the fingers of the hand relative to the palm, the movable blade being carried with the fingers and receiving pressure in opposite directions due to the movement of the fingers through the inner bearing elements 16 and the outer bearing elements 22 between which one or more of the fingers of the operator's hand are arranged to extend.

It will be noted however, that whereas a device constructed as indicated and shown of sheet metal may be manufactured at a relatively small cost, it is possible to cast or otherwise form the same, especially in so far as the movable member is concerned, or if preferred to produce the same by the drop forging process without in any way modifying the advantages of the construction as herein explained.

What is claimed is:

A heading implement having pivotally connected fixed and movable blades, means attachable to the hand of an operator for supporting one of said blades, and means carried by the other blade for receiving the pressure of the fingers of said hand, one of the blades being provided with spaced parallel cutting edges separated to receive the cutting edge of the other blade and having its said edges adjacent to the pivotal end of the blade provided with receding or reëntrant portions forming a pocket.

In testimony whereof I affix my signature.

ANDREW P. JORDAN.